United States Patent

Kambara et al.

[11] Patent Number: 5,997,990
[45] Date of Patent: Dec. 7, 1999

[54] OPTICAL ELEMENT RETAINING MEMBER AND METHOD OF MANUFACTURING SAME

[75] Inventors: Toshiyuki Kambara; Koji Takemura, both of Kyoto, Japan

[73] Assignee: Kyocera Corporation, Kyoto, Japan

[21] Appl. No.: 08/903,462

[22] Filed: Jul. 30, 1997

[30] Foreign Application Priority Data

Jul. 31, 1996 [JP] Japan ................................. 8-202377

[51] Int. Cl.⁶ ................................................. B32B 3/00
[52] U.S. Cl. ............................................. 428/167; 428/172
[58] Field of Search ................................. 428/167, 168, 428/172, 141, 145, 149, 428, 446, 913.3; 359/34, 341, 576, 570

[56] References Cited

U.S. PATENT DOCUMENTS 4,239,075  12/1980  Hedland ................................. 428/167
5,525,384   6/1996  Gilmore et al. ........................ 428/91

*Primary Examiner*—Donald Loney
*Attorney, Agent, or Firm*—Loeb & Loeb, LLP

[57] ABSTRACT

An optical element retaining device has a substrate and a convex section integrally bonded to the substrate for retaining at least one optical fiber. The convex section includes at least one groove for retaining the optical fiber. A mold having at least one groove is used to form the convex section. A mixture of, for example, ceramic powder and a binder is filled in the groove of the mold. The substrate is brought into contact with the mold with the mixture being placed between the mold and the substrate. Then the mold is removed from the substrate while leaving the mixture defining the convex section on the substrate. The substrate and the molded convex section are burned or sintered to permanently bonded to one another.

9 Claims, 4 Drawing Sheets

OPTICAL ELEMENT RETAINING MEMBER AND METHOD OF MANUFACTURING SAME

BACKGROUND OF THE INVENTION

The present invention relates to an optical element retaining member for retaining optical fibers, optical semiconductor elements which are used in optical connectors, optical modules and so on.

Conventionally substrates are used which are provided with a plurality of grooves as the retaining members for the optical fibers. For example, a retaining member 10 shown in FIG. 6, (a) and FIG. 6(b) is a plate-shaped body with a V-shaped groove 13 being formed for retaining the optical fiber. When bare fibers 21 each having the jacket of the optical fiber 20 peeled off are arranged side by side in the V-shaped grooves 13. Glass 16 is fixedly filled in the gap of both by covering the bare fibers with a cover body 15, each bare fiber 21 is firmly supported at three points and a plurality of optical fibers 20 can be retained in regular order with high accuracy. Furthermore, a groove 14 can be provided in order to insert a guide pin for positioning use into both the end portions of the groove 13 for retaining the optical fiber use (refer to Japanese Laid-Open Patent Application Tokkaisho 62-215208).

It can be used as an optical connector with the end face 10a of the retaining member 10 being brought into contact with each other or it can be used as an optical module with an optical waveguide path being connected with the end face 10a of the retaining member 10 or a receiving light emitting element being connected.

As a material quality of the retaining member 10 and the cover body 15 various types of ceramic or glass can be used. A groove 13 precisely worked is formed through a precise working operation on the retaining member 10. Since a step of forming the groove 13 by conducting the precise working operation upon the retaining member 10 requires much labor extremely, it is required to work with high accuracy the groove 13 by a step as simple as possible.

Recently, it is conducted to form a V-shaped groove by an etching operation by using a silicon substrate. As shown in FIG. 7(a), a heat oxide film is formed as masking 31 on the retaining member 10, made of a single crystal silicon plate-shaped body made to become a predetermined crystal bearing. As shown in FIG. 7(b), The resist 32 is patterned to remove the heat oxide film in a portion for forming the groove 13. Then, as shown in FIG. 7(c) the heat oxide film is etched using buffer fluorine to form an opening portion 33. As shown in FIG. 7(d), only a portion free from masking 31 is etched by conducting an anisotropy etching operation with the use of potassium hydroxide or the like. In addition, an etching operation is conducted along the V-shape along the crystal face of the silicon, so as to form the V-shaped groove 13. Therefore, as shown in FIG. 7(e), the V-shaped groove 13 of a determined depth can be formed into high precision by the managing of the etching conditions.

The receiving light emitting element 22 is directly mounted, as shown in FIG. 7 (f), on the retaining member 10 made of silicon and the optical module can be constructed by retaining the optical fiber 20 in the groove 13.

In the retaining member 10 made of silicon shown in FIG. 7, there is a problem in that long time is required to work the groove 13 for etching operation. A plurality of grooves 13 different in depth cannot be formed at the same time due to formation of the groove 13 by an etching operation. For example, as is shown in FIGS. 6(a) and 6(b), two types of grooves 13 for retaining the optical fiber and the grooves 14 for guide pin inserting use cannot be formed in the same time. Since the etching operation can be conducted further along the crystal face in the etching operation of the silicon, a working operation can be conducted only in the V shape, preventing an angular groove or a round groove from being formed. A reinforcing plate is inconveniently required, because the retaining member 10 made of silicon is lower in strength.

In the retaining member 10 of ceramic or glass, much labor is required in working the groove 13, as aforementioned above, although the strength is high.

The optical element retaining member of this invention is characterized in that a plurality of convex portions made of ceramic, glass, silicon or the like are integrally spliced with each other on a substrate made of ceramic, glass silicon or the like, and optical elements such as optical fibers, optical semiconductor elements or the like are retained in the concave portions among the convex portions.

In the invention, the intervals of these convex portions are made concave for retaining the optical elements by integrated bonding operation of the convex portions in the predetermined position on the substrate, instead of shaving the concave portions such as grooves from the substrate. Thus, the etching and precise working operations are not necessary to be conducted. The concave portion of high precision can be formed by a simple step.

The optical elements of the invention are referred to as the general optical elements such as ferrules or the like for retaining lens, filter, mirror, optical isolator, optical fiber, in addition to the optical fibers and optical semiconductor elements. The concave portion of the invention indicates not only a groove, but also a position of shape lower than the surrounding.

According to the invention, a mixture material between powder such as ceramic, glass, silicon or the like, and a binder composed of a solvent and an organic filling material is filled into a mold having a concave portion for convex portion use. Then, an optical fiber retaining member is produced from a step of bonding and integrating the mixtures material with the substrate face composed of ceramic, glass, silicon or the like.

Therefore, the mixture material of the convex portion material is filled into a mold including the concave portion, for convex portion use, prepared in advance and the mixture is bonded and integrated on the substrate, so as to transfer the shape of the mold as they are on the substrate. Thus, when the mold is made in advance with high precision, it is possible to mold with high precision the convex portion and the concave portion formed between them.

The integral bonding operation of the convex portion and the substrate includes steps of filling the mixture material into the mold including the concave portion, having releasing, burning operations after fixedly adhering it onto the substrate, or steps of filling the mixture material into the mold, fixing it and then, releasing it, adhering it on the substrate, burning it, or steps of filling the mixture into the mold, fixing it and then, releasing, burning it, bonding it on the substrate or thermally adhering it. It is possible to use a method of bonding between the general glass or the ceramic.

DETAILED DESCRIPTION OF THE PREFERRED EMBODIMENTS

The embodiments of the present invention will now be described.

Figure 1:
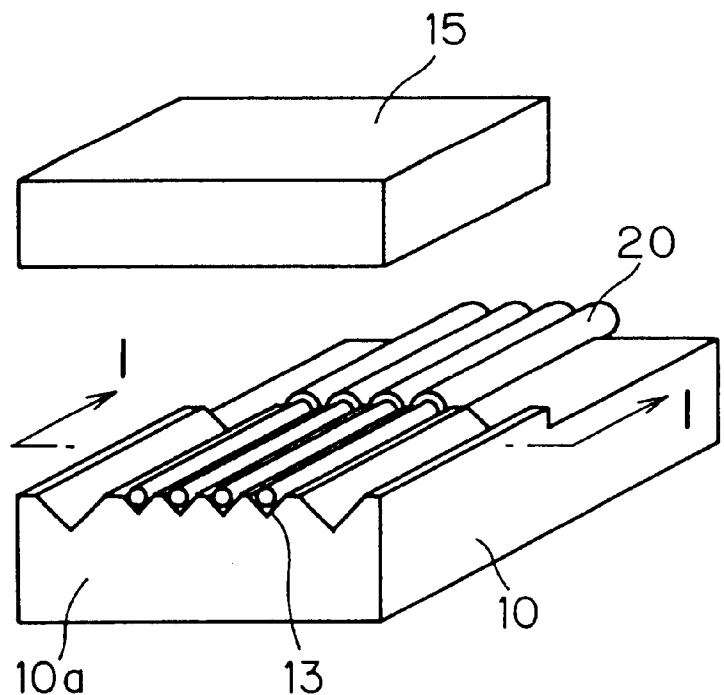
FIG. 1 is a perspective view showing an optical element retaining member of the present invention.
Figure 2:
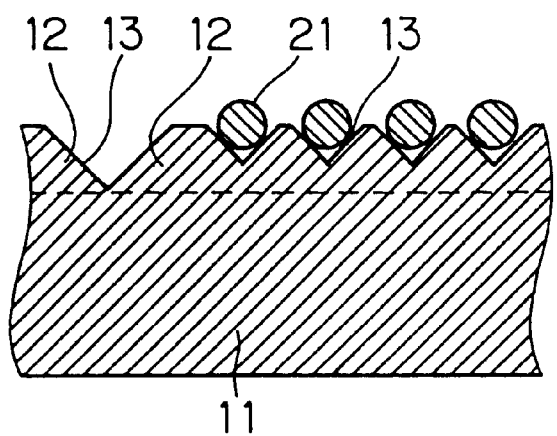
FIG. 2 is a sectional view taken along a line I—I of FIG. 1.

A retaining member 10 for optical fiber use shown in FIG. 1 is a plate-shaped body provided with a plurality of grooves 13 as concave portions for retaining the optical fibers 20 which are optical elements. As shown in FIG. 2, the retaining member 10 indicates a plurality of convex portion 12 composed of ceramic, glass, silicon or the like integrally bonded with each other on the top surface of the substrate 11 made of ceramic, glass, silicon or the like, and is provided as V-shaped grooves 13 between the convex portions 12.

A bare fiber 21 peeled off in the covering of the optical fiber 20 is arranged in the groove 13. It is covered with the cover body 15 so that the end face of the bare fiber 21 may be flush with the end face 10a of the retaining member 10. A plurality of optical fibers 20 are arranged for positioning with high precision by filling of the glass (not shown) in the gap between them.

It can be used as an optical connector with the end face 10a of the retaining member 10 being brought into contact with each other or it can be used as an optical module with an optical waveguide path being connected with the end face 10a of the retaining member 10 or with a receiving light emitting element.

In this manner, the retaining member 10 of the invention can have grooves 13 of high precision formed by a simple step with the convex portion 12 being formed as grooves 13 between them, instead of shaving the grooves 13 through the precise working operation or the etching operation.

A method of manufacturing the retaining member 10 of the invention will now be described.

Figure 3A:
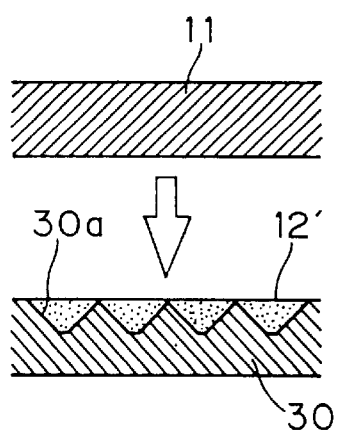
FIG. 3(a) FIG. 3 (b) are views illustrating a method of manufacturing of an optical element retaining member of the invention.

As shown in FIG. 3(a), a mold 30 including a concave portion 30a agreed with the shape of the convex portion 12 is prepared. A mixture material 12' of powder such as ceramic, glass, silicon or the like and a binder of a solvent and an organic adding material as a material quality composing the convex portion 12 is filled in the concave portion 30a of the mold 30.

A substrate 11 made of ceramic, glass, silicon and so on are provided separately. A mold body of the mixture material 12' is integrally bonded on the substrate 11 to form the convex portion 12. Concretely it is produced as follows.

Figure 3B:
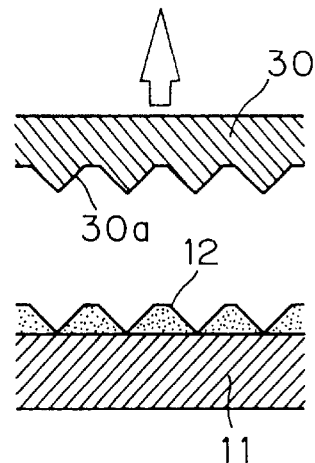

Conduct a bonding operation under pressure with the substrate 11 being pressed against the surface of the mixture material 12' filled in the mold 30. Reaction-harden the mixture 121 or dry it for solidification. Then, as shown with top and bottom being reversed in FIG. 3(b), the convex portion 12 composed of molding body of the mixture material 12' is transferred on the substrate 11 by releasing the mold 30. Finally the whole is processed in debinder. Then, the retaining member 10 shown in FIGS. 1 and 2 can be manufactured by integration through the simultaneous burning.

As another method, the mixture material 12' filled in the mold 30 is reaction-hardened or dry-solidificated. Then, it is released from the mold 30, so as to fix the molding body of the mixture material 12' onto the substrate 11. Finally, the whole is processed in debinder. Then, the retaining member 10 can be manufactured by an integrating operation through the simultaneous burning.

As still another method, the mixture material 121 filled in the mold 30 is reaction-hardened or dry-solidificated. Then, it is released from the mold 30, so as to bond the molding body on the substrate 11 after the whole is processed in debinder. Finally, the retaining member 10 can be manufactured even by an integrating operation through the simultaneous burning of the whole.

Or the mixture material 12' filled in the mold 30 is reaction-hardened or dry-solidificated. Then, the mixture is released from the mold 30. After the burning operation by the processing of the debinder, the retaining member 10 can be obtained even by the splicing through the bonding, heat pressure adhesion or simultaneous burning of the sintered body on the substrate 11.

The bonding operation of the mixture material 12' with the substrate 11 can be bonded can be conducted in an either stage of the mutual member which is unburned, debindered or sintered.

According to such a manufacturing method of the invention, a manufacturing step can be extremely simplified, because the convex portion 12 can be made briefly and the groove 13 can be made. Further, the predetermined groove 13 can be easily formed when the precise working operation is conducted in a shape where the concave portion 30a agrees with the necessary groove 13, because the convex portion 12 and the groove 13 are transferred in the shape of the concave portion 30a of the mold 30.

As ceramic powder for composing the substrate 11 and the convex portion 12 can be used oxide ceramic such as alumina ($Al_2O_3$), zirconia ($ZrO_2$) or the like, non-oxide ceramic such as silicon nitride ($Si_3N_4$), aluminum nitride (AlN), silicon carbide (SiC) or the like or apatite ($Ca_5(PO_4)_3$ (F, Cl, OH)) or the like. Various types of sintering assistants can be added by a given amount to these ceramic powder.

As the sintering assistants can be added to alumina powder by a given amount silica ($SiO_2$), calsia (CaO), yttria ($Y_2O_3$), magnesia (MgO) or the like, to zirconia powder, rare earth element oxide such as yttria ($Y_2O_3$), cerium (Ce), dysporosium (Dy), ytterbium (Yb) or the like, to silicon nitride power, yttria ($Y_2O_3$), alumina ($Al_2O_3$) or the like, to aluminum nitride powder periodic law 3a family element oxide ($RE_2O_3$) or the like, or silicon carbide powder, boron (B), carbon (C) or the like.

As glass powder composing substrate 11 and convex portion 12 can be used various types of glass including one type or more of lead (Pb), sulphur (S), selenium (Se), alum and so on. The substrate 11 and the convex portion 12 can be made of silicon powder. The substrate 11 and the convex portion 12 can be made of composite powder of each material or another powder including the same characteristic as that of the above description.

The grain diameter of the powder of ceramic, glass or silicon of few tens microns through submicrons can be used ideally. Concretely, the range of 0.2 through 10 $\mu$m, of preferably 0.2 through 5 $\mu$m is desirable.

As an organic adding material to be added to the ceramic, glass, silicon powder can be used urea resin, melanine resin, phenol resin, epoxy resin, unsaturated polyester resin, alkyd resin, urethane resin, ebonite, polysiloxane silicate or the like. As a means for reaction-hardening the organic adding materials is heat-hardening, ultraviolet ray radiation hardening, X-ray radiation hardening operation or the like. The heat hardening operation is optimum during the operation in terms of the apparatus and unsaturated polyester resin is preferable in terms of pot life.

The content of the organic adding materials is required not to increase viscosity so as to retain the fluidity and molding of the mixture between the powder such as ceramic, glass, silicon or the like and the sintering assistants. It is desirable to have a sufficient shape maintaining property at the hardening time. Thus, the content of the organic adding materials is desirable to be 0.5 part by weight or more with respect to 100 parts by weight of the powder such as ceramic, glass, silicon or the like. 35 parts by weight or lower is desirable in terms of contraction of the molding body due to hardening. Especially 1 through 15 parts by weight are most suitable, considering the contraction at the burning time.

A solvent to be added into the mixture material 121 is not restricted specially when the organic adding material is mutually soluble. For example, an aromatic solvent such as toluene, xylene, benzene, ester phthalate or the like, high class alcohol such as hexanol, octanol, decanol, oxialcohol or the like or ester such as ester acetate, glyceride or the like.

Especially, the ester phthalate, oxialcohol or the like can be used suitably. Further, the solvents of two types or more can be used jointly, so as to volatilize the solvents gently.

The content of the solvents is necessary to be 0.1 part or more by weight with respect to the 100 parts by weight of powder such as ceramic, glass, silicon or the like to maintain the shape of the molding body in terms of the molding. On the other hand, 35 parts by weight or lower is desired to lower the viscosity of the mixture material between the powder of ceramic, glass, silicon or the like and the organic adding material. Considering the contraction at the drying time and the burning time, 1 through 15 parts by weight are most desired.

The mold 30 of the invention is not restricted especially to the material quality when nothing interferes in hardening of the organic adding materials. For example, metal, resin, rubber or the like can be used. A surface processing operation such as surface coating or the like can be conducted to improve the releasing operation or prevent the abrasion when necessary.

The substrate 11 is a green sheet or sintered body of unburned ceramic, glass, silicon or the like. For example, various types of ceramic green sheet, various types of glass substrate and porcelain substrate or the like are used. Material quality similar to that of the convex portion 12 or material quality approximate to the thermal expansion factor thereof is used. As a glass substrate can be used comparative low-priced glass such as soda lime or inorganic filler being dispersed so as to improve its distortion.

To improve the bonding property in the pressure adhesion between the mixture material 12' and the substrate 11, various coupling agents such as silane coupling agent, titanate coupling agent, aluminate coupling agent or the like can be used. Especially, the silane coupling agent is suitable, because the reaction property is higher.

The pressure adhesion between the mixture material 12' and the substrate 11 is desirable to use a static hydraulic apparatus in terms of application of equal pressure. As the pressure applying conditions, the pressure range becomes controlled so that the mold 30 may not be deformed, and the pressure range depends upon the strength of the mold 30. When a mold 30 made of, for example, silicon rubber is used, it is desired to conduct an operation under the pressure conditions of approximately 100 g/cm$^2$.

In order to improve the dispersion property of ceramic or glass powder in the mixture 12', interfacial activator such as polyethylene glycol ether, algil sulfonic acid salt, polycarbon acid salt, alkylammonium salt or the like can be used. As the content thereof is desired 0.05 through 5 parts by weight with respect to 100 parts by weight of ceramic or glass powder in terms of improvement of dispersion and thermal cracking property.

Furthermore, a hardening catalyst called hardening reaction promoting agent or polymerization starting agent can be added to the binder of the mixture material 12'. As the hardening catalyst can be used organic peroxide or azo compound. There are organic peroxide such as kentone, peroxide, peroxyketal, peroxyester, hydroperoxyide, peroxycarbonate, t-butyl peroxy-2-ethylhexanoate, vis (4-t-butyl cyclohexyl), peroxydicarbonate, dikmilperoxide or azo compound such as azobis, isobutyronitrile or the like.

Another embodiment of the invention will now be described.

According to the invention, the shape of the groove 13 of the retaining member 10 is not necessary to be made V-shape. The groove 13 of the various shapes can be made by changes in shape of the concave portion 30a of the mold 30.

Figure 4A:
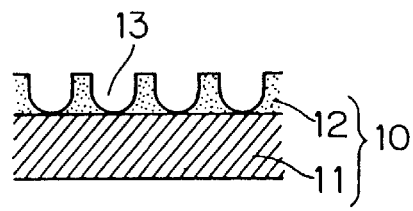
FIGS. 4(a) through (d) is a sectional view showing another embodiment of an optical element retaining member of the invention.
Figure 4B:
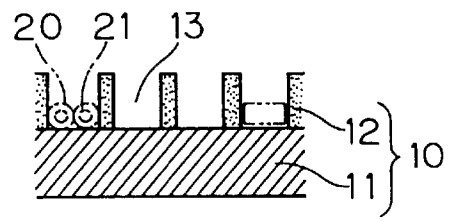

When the groove 13 is made to become round in groove to agree with the shape of the optical fiber 20 as shown in FIG. 4(a), the optical fiber 20 can be retained firmly. The groove 13 can be made square as shown in FIG. 4(b). In this case, the bare fiber 21 of a plurality of optical fibers 20 can be retained in one groove 13. The element of IC or the like can be mounted in the groove 13.

Figure 4C:
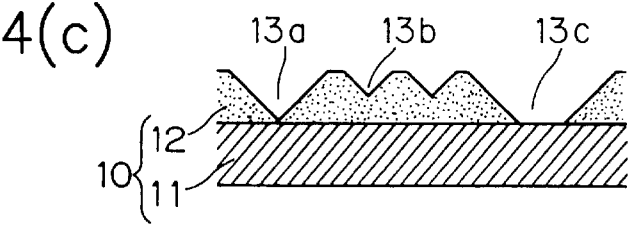

The grooves 13a, 13b and 13c different in depth or the like can be formed simultaneously as shown in FIG. 4(c). In this case, the groove 13b is used to maintain the bare fiber 21 of the optical fiber. The groove 13a is used to insert the guide pin (not shown) for positioning operation. The groove 13c is used to insert the guide pin, to retain the bare fibers 21 of a plurality of optical fibers or to mount the element of IC or the like.

Figure 4D:
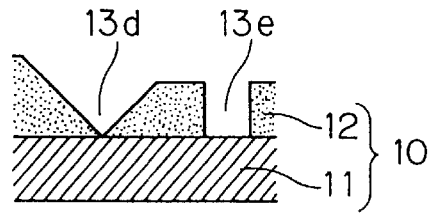

As shown in FIG. 4(d), different grooves such as V groove 13d, rectangular groove 13e or the like can be formed in an optional size.

A receiving light emitting element composed of optical semiconductor element is mounted in the retaining member 10 of the invention and can be used as an optical module.

Figure 5A:
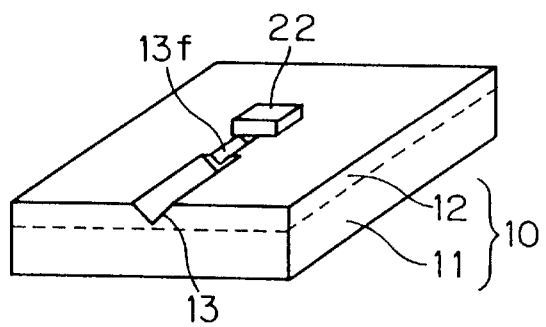
FIG. 5(a) is a perspective view showing a still another embodiment of the optical element retaining member of the invention.

As shown in FIG. 5(a), the retaining member 10 is integrally spliced with the convex portion 12 on the substrate 11 with the groove 13 being provided between them. The groove 13 for retaining the coating portion of the optical fiber 20 and a groove 13f for retaining the bare fiber 21 whose coating being peeled off are provided continuously, with the receiving light emitting element 22 being mounted on the end portion of the groove 13f.

Figure 5B:
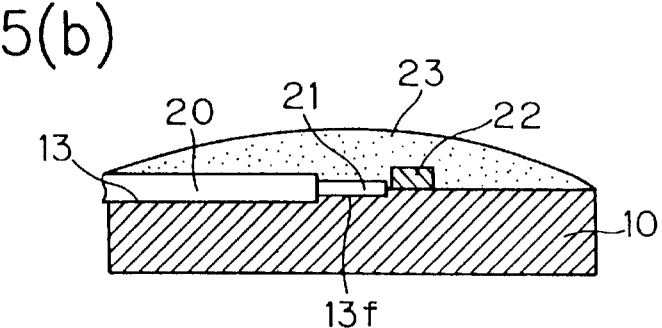
FIG. 5(b) is a longitudinally sectional view where it is applied to an optical module.
Figure 6A:
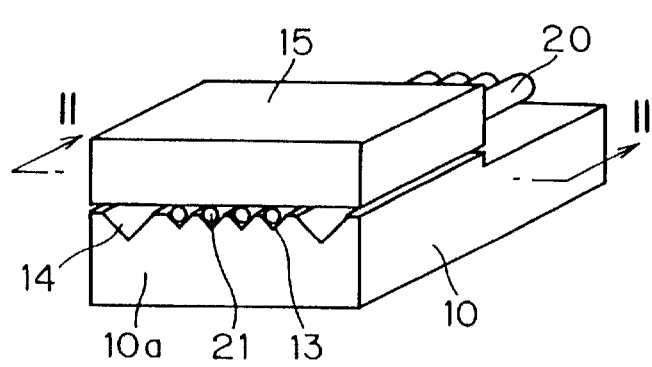
FIG. 6(a) is a perspective view showing the conventional optical element retaining member.
Figure 6B:
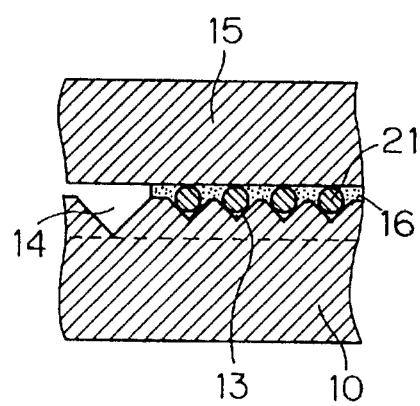
FIG. 6(b) is an enlarged sectional view of a line taken along a line of II—II of FIG. 6(a)
Figure 7A:
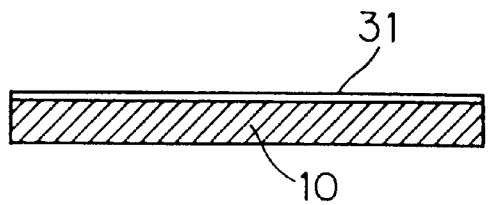
FIGS. 7(a)–7(e) are views illustrating a conventional method of forming an optical element retaining member using silicon.
Figure 7B:
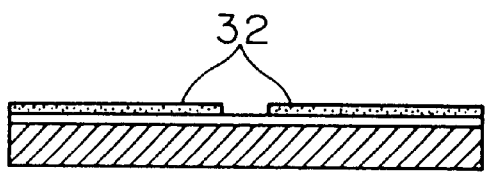
Figure 7C:
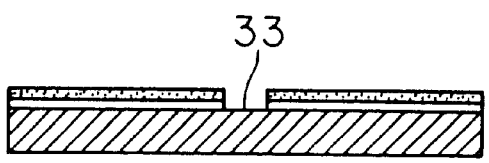
Figure 7D:
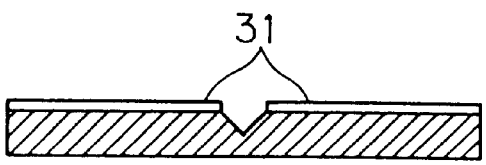
Figure 7E:
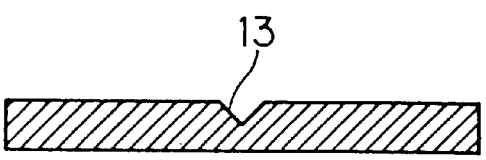
Figure 7F:
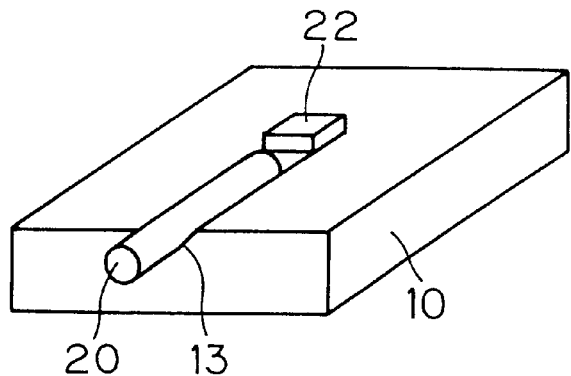
FIG. 7(f) is a perspective view of the optical element retaining member thus formed.

When the whole is molded by resin 23 with the optical fibers 20 being retained in the grooves 13 and 13d as shown in FIG. 5(b), so as to oppose the end face of the bare fiber 21 to the receiving light emitting face of the receiving light emitting element 22, the optical module can be provided. When the retaining member 10 is formed of ceramic or glass higher in strength, the reinforcing members are not necessary to be provided with, so as to provide extremely simple construction.

In the above described example, the groove 13 is formed. In the retaining member of the invention, the concave portion except for the groove 13 can be formed, and the various types of optical elements can be retained in the concave portion.

As the optical element to be retained in the concave portion, the various members can be used without limitation to the optical fiber 20. For example, an optical semiconductor element composed of a receiving light emitting element, and a ferrule with lens, filter, mirror, optical isolator or optical fiber 20 retained on it can be retained in the concave portion.

For example, metallic film or the like is formed in the V-shaped groove 13 and can be used as a mirror for reflecting optical signals. Or a ferrule retained on the optical fiber 20 is retained in a groove 13 so that one end of the ferrule may be extended in one end, and another member is connected with the projecting portion.

According to the invention, a plurality of convex portions made of ceramic, glass, silicon or the like are spliced with each other on the substrate made of ceramic, glass, silicon or the like, so as to retain an optical element such as optical fiber, optical semiconductor element or the like in the concave portion between these partitions. The etching operation and the precise working operation are not necessary to be conducted. The concave portion of high precision can be formed with simple steps.

According to the invention, the shape of the mold is transferred as it is on the substrate by manufacturing the optical element retaining member from a step of integrally splicing these mixture material with the substrate made of ceramic, glass, silicon or the like after filling, in the mold including the concave portion for convex portion use, mixture material between powder such as ceramic, glass, silicon or the like and the binder made of solvent and organic adding material. When the mold is manufactured in advance with high precision, the convex portions and the concave portion to be formed between them can be formed with high precision by a simple step.

What is claimed is:

1. An optical element retaining member for retaining at least one optical fiber, comprising:

a substrate made from one of ceramic, glass and silicon; and at least one convex portion made from one of ceramic, glass and silicon integrally bonded to the substrate, the at least one convex portion including at least one concave portion for retaining the at least one optical fiber.

2. The optical element retaining member according to claim 1, wherein the at least one concave portion includes a groove for retaining the at least one optical fiber.

3. The optical element retaining member according to claim 2, wherein the groove is one of V, round and square grooves.

4. The optical element retaining member according to claim 2, wherein the at least one concave portion includes a plurality of grooves for retaining a plurality of optical fibers, respectively.

5. The optical element retaining member according to claim 2, wherein the groove defines an end portion on the substrate, and further comprising a light-emitting element provided at the end portion of the groove.

6. The optical element retaining member according to claim 1, wherein the at least one convex portion is formed from a sintered body of at least sinterable powder.

7. The optical element retaining member according to claim 6, wherein the sinterable powder is one of ceramic powder, glass powder and silicon powder.

8. The optical element retaining member according to claim 7, wherein the substrate and the at least one convex section are bonded by sintering.

9. The optical element retaining member according to claim 1, further comprising a cover member to cover the at least one convex portion integrally bonded to the substrate.

* * * * *